US008605956B2

(12) United States Patent
Ross et al.

(10) Patent No.: US 8,605,956 B2
(45) Date of Patent: Dec. 10, 2013

(54) AUTOMATICALLY MINING PERSON MODELS OF CELEBRITIES FOR VISUAL SEARCH APPLICATIONS

(75) Inventors: David Ross, San Jose, CA (US); Andrew Rabinovich, San Diego, CA (US); Anand Pillai, Los Angeles, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 535 days.

(21) Appl. No.: 12/859,721

(22) Filed: Aug. 19, 2010

(65) Prior Publication Data

US 2011/0116690 A1 May 19, 2011

Related U.S. Application Data

(60) Provisional application No. 61/272,912, filed on Nov. 18, 2009.

(51) Int. Cl.
*G06K 9/00* (2006.01)

(52) U.S. Cl.
USPC ......... 382/118; 713/186; 340/5.53; 340/5.83

(58) Field of Classification Search
USPC ............... 382/115–127; 356/71; 713/186; 340/5.1, 5.2, 5.52, 5.53, 5.8–5.86; 902/3
See application file for complete search history.

(56) References Cited

U.S. PATENT DOCUMENTS

| | | | | |
|---|---|---|---|---|
| 8,213,689 | B2 * | 7/2012 | Yagnik et al. | 382/118 |
| 2003/0210808 | A1 * | 11/2003 | Chen et al. | 382/118 |
| 2004/0264780 | A1 * | 12/2004 | Zhang et al. | 382/224 |
| 2007/0258646 | A1 * | 11/2007 | Sung et al. | 382/191 |
| 2008/0310720 | A1 * | 12/2008 | Park et al. | 382/181 |
| 2009/0234842 | A1 * | 9/2009 | Luo et al. | 707/5 |
| 2010/0008547 | A1 * | 1/2010 | Yagnik et al. | 382/118 |
| 2011/0115940 | A1 * | 5/2011 | Ojima et al. | 348/222.1 |
| 2012/0063650 | A1 * | 3/2012 | Webb | 382/118 |
| 2012/0084308 | A1 * | 4/2012 | Kang | 707/758 |
| 2012/0114197 | A1 * | 5/2012 | Zhang et al. | 382/118 |

OTHER PUBLICATIONS

International Search Report and the Written Opinion of the International Searching Authority for International Application No. PCT/US2010/056869, mailed Mar. 29, 2011, 18 pages.

Berg et al., "Names and Faces in the News," Proceedings of the 2004 IEEE Computer Society Conference on Computer Vision and Pattern Recognition, vol. 2, Jun. 27, 2004, pp. 848-854.

Cour et al., "Learning from Ambiguously Labeled Images," IEEE Computer Vision and Pattern Recognition, Jun. 20, 2009, pp. 919-926.

(Continued)

*Primary Examiner* — Aaron W Carter
(74) *Attorney, Agent, or Firm* — Mahamedi Paradice Kreisman LLP; Van Mahamedi

(57) ABSTRACT

Methods and systems for automated identification of celebrity face images are provided that generate a name list of prominent celebrities, obtain a set of images and corresponding feature vectors for each name, detect faces within the set of images, and remove non-face images. An analysis of the images is performed using an intra-model analysis, an inter-model analysis, and a spectral analysis to return highly accurate biometric models for each of the individuals present in the name list. Recognition is then performed based on precision and recall to identify the face images as belonging to a celebrity or indicate that the face is unknown.

20 Claims, 9 Drawing Sheets

(56) References Cited

OTHER PUBLICATIONS

Cui et al., "EasyAlbum: An Interactive Photo Annotation System Based on Face Clustering and Re-ranking," CHI 2007 Proceedings of the Conference on Human Factors in Computing Systems, Apr. 28, 2007, pp. 367-376.

Foucher, Samuel and Langis Gagnon, "Automatic Detection and Clustering of Actor Faces based on Spectral Clustering Techniques," IEEE Conference on Computer and Robot Vision, May 1, 2007, pp. 113-122.

Guillaumin et al., "Automatic Face Naming with Caption-based Supervision," 2008 IEEE Conference on Computer Vision and Pattern Recognition, Jun. 23, 2008, pp. 1-8.

Huang et al., "Labeled Faces in the Wild: A Database for Studying Face Recognition in Unconstrained Environments," University of Massachusetts, Amherst, Technical Report 07, 2007, pp. 1-14.

Jain, Vidit and Erik Learned-Miller, "FDDB: A Benchmark for Face Detection in Unconstrained Settings," University of Massachusetts, Amherst, Technical Report 07, 2010, 11 pages.

Le, Duy-Dinh and Shin'ichi Satoh, "Unsupervised Face Annotation by Mining the Web," 2008 Eighth IEEE International Conference on Data Mining, Dec. 15, 2008, pp. 383-392.

Le et al., "Finding Important People in Large News Video Databases Using Multimodal and Clustering Analysis," IEEE $23^{rd}$ International Conference on Data Engineering Workshop, 2007, 10 pages.

Tian et al., "A Face Annotation Framework with Partial Clustering and Interactive Labeling," IEEE Conference on Computer Vision and Pattern Recognition, Jun. 1, 2007, pp. 1-8.

Wang et al., "Face recognition using spectral features," Pattern Recognition, vol. 40, No. 10, May 24, 2007, pp. 2786-2797.

Yagnik, Jay and Atiq Islam, "Learning People Annotation from the Web via Consistency Learning," Workshop on Multimedia Information Retrieval, Feb. 2000, pp. 285-290.

Yang et al., "Multiple Instance Learning for Labeling Faces in Broadcasting News Video," ACM International Conference on Multimedia, 2005, 10 pages.

Zitouni et al., "Recognizing faces in news photographs on the web," IEEE $24^{th}$ International Symposium on Computer and Information Sciences, Sep. 14, 2009, pp. 50-55.

* cited by examiner

AUTOMATICALLY MINING PERSON MODELS OF CELEBRITIES FOR VISUAL SEARCH APPLICATIONS

CROSS-REFERENCE TO RELATED APPLICATIONS

This application claims the benefit under 35 U.S.C. §119(e) of U.S. Provisional Application No. 61/272,912, filed Nov. 18, 2009, which is incorporated by reference herein in its entirety.

BACKGROUND

1. Field

Embodiments of this invention relate to recognizing persons in visual content.

2. Background Art

The Internet hosts vast amounts of content of different types including text, images, and video. Leveraging this content requires the content to be searchable and organized. Images are generally searched and organized based on identifiers that are manually assigned by users.

In particular, when an image is that of a person's face, the recognition of that face by a person can be done with extremely high accuracy despite large variations in appearance, lighting, and expressions. Computer vision systems, on the other hand, have had a difficult time in performing recognition at the level of accuracy of a human being. Although face recognition has been a long standing problem in computer vision and other domains, the main focus of the industry has been the recognition of faces in controlled environments with fairly small datasets. As the datasets increase into the thousands, each with appearance variations due to illumination, pose, and expression, the task of successful verification and recognition has been lacking.

As small datasets of famous people have become available, an effort to recognize celebrities in the news has also occurred. Algorithms for face identification, verification, and recognition have been developed that typically contain datasets constrained to news pictures that are usually of high quality, taken in controlled environments, and in controlled poses. In contrast, generic images of people of interest in uncontrolled environments lack the ability to be automatically recognized and verified.

Therefore, what are needed are methods and systems to automatically mine person models of celebrities for visual search applications.

SUMMARY

In one embodiment, a computer-implemented method is provided for identifying celebrity face images that generates a name list of prominent celebrities, obtains a set of images and corresponding feature vectors for each name, detects faces within the set of images and removes non-face images. An analysis of the images is performed using an intra-model analysis, an inter-model analysis, and a spectral analysis to return highly accurate biometric models for each of the individuals present in the name list. Recognition is then performed based on precision and recall to identify the face images as belonging to a celebrity or that the face is unknown.

In another embodiment, a system for identifying faces of celebrities is provided that includes a name list generator that produces names of prominent celebrities, a face signature detector that obtains a set of images and corresponding feature vectors for each name, detecting faces within the set of images and removing non-face images. A person model learning system performs an analysis of the images using intra-model, inter-model analysis, and spectral analysis to return highly accurate biometric models for each face image. Recognition is then performed based on precision and recall to identify the face images as belonging to a celebrity or to indicate that the face is unknown.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

Figure 1:
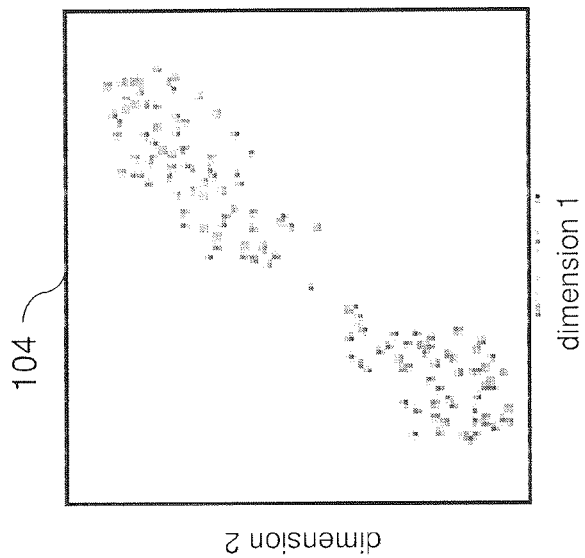
FIG. 1 shows two graphic examples of pairwise similarities according to an embodiment of the present invention.
Figure 1:
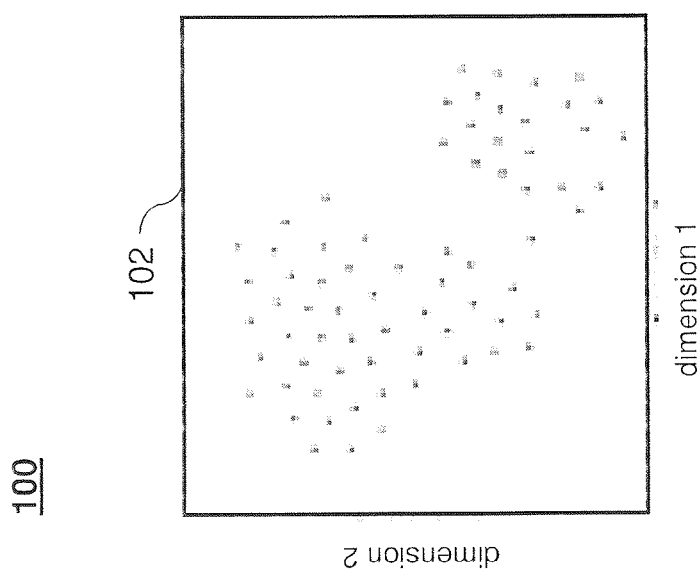

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Increasingly larger collections of images are becoming available with the proliferation of content spurred by the widespread availability of image capture devices and the connectivity offered by the Internet. Through the use of interconnected networks and shared image collections, at any instant, a single user may have access to a large collection of content on various subjects authored by persons spread throughout the world. A system that can automatically identify and recognize faces in datasets containing tens of thousands of individuals in a natural environment is very useful. The methods and systems described herein make use of large article and image corpora available, for example, on the Internet, to automatically associate names and faces of celebrities. In an embodiment of the present invention, the system can learn biometric models and recognize faces by crawling the web and learning from images of faces and their annotations. Such images can be obtained from any type of image content including still images, videos, holograms, and other media type or rendering methodology. Utilizing the framework of cloud computing, a query image can be acquired with a mobile device, where the name of a queried face in the image is returned to the device.

Training Data Collection

Name List and Images on the Web

In an embodiment of the present invention, an unsupervised face recognition system uses a training set generation that is generated without manual interaction. The only input to the system is a list of names of prominent celebrities that the system attempts to recognize. Such a list of names can be obtained from multiple sources, such as articles available over the Internet, e.g., Wikipedia, where the articles are filtered to retain only those articles that mention the names of people. The various names can then be associated with images available through the Internet using any available service, such as the Google Image Search (GIS) produced by Google, Inc. of Mountain View, Calif. Using such a service, face images can be retrieved and associated with the list of names found in the article. The names within the list can then be ranked based on the number of face images returned by the image search for each name.

In such an embodiment, once the name list is defined, the first step is to collect a set of images and corresponding feature vectors for each name on the list. This may be accomplished by issuing a query to an available Internet image search system, such as the Google Image Search, and recording a threshold number of images returned for each query, detecting faces, and extracting feature vectors from the images, and putatively labeling each feature vector with the query from which it was obtained. Given the possibility of mistakes inherent in Internet based image searches, a subset of the initial set of feature vectors will be labeled incorrectly. In an embodiment, further training seeks to improve the quality of the training data by identifying and discarding incorrectly labeled entries. In another embodiment, if an image is returned for more than one celebrity name query, then multiple copies of the resulting feature vectors can be stored with each copy and labeled with the query that produced it. In a similar fashion, if an image contains two or more faces, then all of the faces are putatively labeled with the query name. However, in both cases, resolving which face is actually the celebrity in question will be handled at a later stage.

Detection

In an embodiment of the present invention, to avoid obvious outliers returned by the image search, a face detector is used to remove non-face images from the initial results. The detector uses, for example, a fast sliding-window approach over a range of window sizes. In an embodiment, the detector employs a linear combination of a heterogeneous set of feature detectors, which are based on families of features of varying complexity encompassing (1) simple but fast features such as bit features, as well as (2) more expensive but more informative features such as Gabor wavelets. The detector is trained by minimizing an objective function that employs a logistic loss term and $L_1$ regularization. The output can be a score assigned to each window in the range [0, 1]. When all scales are processed, the remaining windows are filtered and merged according to their scores and overlap across scales. The detector parameters can include a tilt (pitch) angle, set to a threshold level, such as ±30 degrees and a minimum box-size, such as 40 pixels. In another embodiment, the face detection score can be further refined by adding a landmarker sub-system that pinpoints facial feature locations within a face bounding box. Features extracted at those locations can then be used to obtain a refined score that indicates the probability of a face being present. One embodiment uses a detection algorithm that belongs to a large family of sliding window detectors such as the seminal Viola and Jones detectors. Extracted feature vectors can be further processed by reducing the dimensionality using principal component analysis (PCA), and a weighted dot product can be used to measure the similarity between two features vectors.

A person of ordinary skill in the art will recognize that an embodiment can be built upon any detector of high precision and recall.

Person Model Learning

This section describes, according to an embodiment of the present invention, the overall pipeline that takes raw image search results as input, and returns highly accurate biometric models for tens of thousands of individuals present in a name list.

Intra-Model Analysis

In an embodiment of the present invention, a large name list, such as with a set of 30,000 names, e.g., Q=30,000, can be used to generate training data. In one embodiment, the variable $M^q$ is a set of at most 1000 images returned by the image search, for $q \in [1,Q]$, with the first phase of removing incorrectly labeled training examples, e.g., $M^q_{outlier}$, from $M^q$ done by analyzing $M^q$ itself. In particular, each of the feature vectors are examined, $\vec{f}$ within $M^q$, discarding those images with low affinity to the remaining vectors in $M^q$. In this stage, each $M^q$ is analyzed individually such that the similarity between faces images returned for different names q is not yet considered.

In an embodiment, for each image $I_i$ in $M^q$ represented by $\vec{f}_i$, a nearest neighbor grouping can be performed by counting the number of neighbors and the number of near duplicates in the group, where a neighbor is defined as a face with $\phi(\vec{f}_i, \vec{f}_j) \geq \tau_n$, and a near duplicate as with $\phi(\vec{f}_i, \vec{f}_j) \geq \tau_d$, with $\phi(\cdot) \in [0,1]$. In an embodiment, the similarity function $\phi(\cdot)$ can be learned using images and labels from the image search; however, alternative distance metrics are plausible for this framework.

Images with fewer than k nearest neighbors can then be removed from $M^q$. To reduce redundancies, all near duplicates of an image represented by $I_i$ can be removed. Elements of $M^q$ can then be sorted in decreasing order of near duplicate counts. Each face in the sorted list, if it has a near duplicate image appearing earlier in the list, can be discarded; otherwise it can be retained. It can be noted that such a local outlier removal approach can aid in high recall that is important for reducing false negatives. Through this process, an initial collection of labeled faces corresponding to a given face model can be identified.

Inter-Model Analysis

In an embodiment of the present invention, this phase starts with the collection of labeled faces remaining after intra-model analysis, and seeks to further remove incorrectly labeled entries by comparing faces from different models, e.g., annotated with different names. If a collection contains two near duplicate faces with different labels, then almost certainly one, or both, of the labels is incorrect, and the face cannot be used to reliably label incoming query faces. The inter-model analysis stage aims to resolve near duplicate faces by considering all faces in the collection in a pairwise manner. For each pair ($\vec{f}_i$, $\vec{f}_j$), if $\phi(\vec{f}_i, \vec{f}_j) > \tau$, e.g., faces i and j have a similarity more than $\tau$ and the labeled celebrity names disagree, then the face with the smallest near duplicate count, as calculated during intra-model analysis, is marked for later removal. Once all face pairs have been considered, the faces marked for removal are discarded from the collection, and removed from the set $M^q$ to which they belonged. Note, this formulation compares each face against every other face in the collection, thus it is possible for a single face to lose during some comparisons, or be marked for removal, and win others. In either case, feature vectors are discarded from the collection if they lose during any comparison.

Spectral Analysis

In an embodiment of the present invention, the spectral analysis stage, unlike the intra-model and inter-model analysis stages where individual face, e.g., near duplicate and nearest neighbor, statistics were considered, this stage aims to evaluate the global statistics of individual models. At the start of the Spectral Analysis stage each set $M^q$ of face feature vectors contains only those elements that were not already discarded during Intra-model or Inter-model analysis.

For each model $M^q$, a set of feature vectors $\vec{f}_i$, with i=1 ... $\|M^q\|$, the goal is to cluster the $\vec{f}_i$ into k groups, and to remove one of the groups as an outlier class. In an embodiment, this begins by computing a similarity $S_{ij} = \phi(\vec{f}_i, \vec{f}_j)$ that measures, with $S \in [0,1]$, for each pair of ($\vec{f}_i$, $\vec{f}_j$) in $M^q$. The similarities $S_{ij}$ can be viewed as weights of an undirected graph G over model $M^q$. The Matrix S plays the role of a "real-valued" adjacency matrix for G. Next, let $d_i = \Sigma_{j \in M^q} S_{ij}$ be the degree of node i, and D be the diagonal matrix with $d_i$ as its diagonal. Finally, a graph Laplacian of G is defined as $L = D^{-1/2} S D^{-1/2}$ ensuring that the eigenvalues range between [0,1] with the largest eigenvalue equaling one. In an embodiment, some traditional spectral clustering algorithms proceed by choosing k dominant eigenvectors of L, based on their eigenvalues, and project the original data in $\Re^n$ (n=$\|M^q\|$) onto these k eigenvectors, thus mapping $\Re^n \to \Re^k$. However, with a high degree of confidence, it is believed that the clusters that comprise $M^q$ are spherical as seen in FIG. 1, and data in $M^q$ does not require the projection. In an embodiment, FIG. 1 represents mapping to $\Re^2$ of pairwise similarities of one's face signatures. Plot 102 represents 71 images in Britney Spears' face model. Plot 104 represents 141 images in Barack Obama's face model. In this embodiment, it is evident that Britney Spears has either various canonical appearances or her model is consistently polluted, as the distribution for Barack Obama indicates that images of him are mostly similar, are changing slightly from one to another, and are usually the same appearance.

As such, the graph Laplacian L is used only to determine the model order k. The eigenvalues of L are sorted in descending order, with $\lambda 1 = 1$, and the rest of eigenvalues decrease to zero. The distribution of eigenvalues is used as an estimate of the distortion, or pollution of the model M. If the remaining eigenvalues fall off too quickly, then it is assumed that $M^q$ is not polluted, and all of its members have strong support among its neighbors. If, however, some eigenvalues are indeed large, e.g., $> \tau$, then k is determined by the number of eigenvalues that are greater than $\tau$.

In an embodiment, with the appropriate model order, k, the entries in $M^q$ are clustered using agglomerative clustering. Iterative binary clustering can be chosen over k-way clustering since multiway performs better only when the original data is not noisy and the chosen k=$k_{true}$. Since the data can be wrongly labeled, iterative binary clustering is more appropriate in this case. Faces in $M^q$ can be clustered using hierarchical clustering with average linking, using the following similarity function:

$$\Phi_{ij} = \sqrt{\left(\sum_{l=1}^{n} (S_{il} - S_{jl})\right)^2}.$$

Instead of simply using a pairwise similarity $S_{ij}$, in an embodiment, a more global similarity metric can be used that considers a cumulative similarity between $\vec{f}_i$ and the rest of faces in $M^q$.

Once $M^q$ is partitioned into clusters $C_1 \ldots C_k$, an outlier cluster is chosen. The outlier selection may be done either by the statistics of the clusters, e.g., cluster size, entropy, average cluster image rank, or average duplicate count computed in the previous stages, or by comparing to the model $M^{q'}$, where $q \neq q'$. Mainly, the cluster that is most similar to $M^{q'}$, $$\underset{i}{\operatorname{argmax}} \phi(C_i, M^{q'}),$$

is deemed to be the outlier cluster, and is discarded. Note, $\phi(C_i, M^{q'})$ is simply the average pairwise similarity between cluster $C_i$ and model $M^{q'}$. The comparison is then complete with the collections of all persons in the name list. Faces in the remaining clusters are compared individually to entries in $M^q$ and $M^{q'}$. Those that have a higher average similarity to $M^{q'}$ are removed from $M^q$. Rather than comparing $M^q$ to each of the Q−1 remaining models, resulting in q(Q−1)/2 pairwise comparisons, it is possible to compare $M^q$ to only a small number of models with which it is most similar. For example, $M^q$ could be compared only to the single model $M^{q'}$ with which it shared the larges set intersection prior to Intra-model analysis. Alternatively, $M^q$ could be compared with other models $M^{q'}$ until $\|M^q\| < 2$.

Representative Image

In an embodiment of the present invention, a representative image of a person is automatically selected. A representative image of a person is defined by a set of similarity features, e.g., face signatures, clothing, sunglasses, hair color, backdrop, etc., from the set of images and corresponding feature vectors discussed above.

Selecting a representative image based on facial features can be accomplished by first clustering the facial images of the person of interest based on face similarity. As known to one of skill in the art, any of several clustering algorithms can be used, e.g., any pairwise or central method, to create the clusters. As an example, a mean-shifting clustering can be used to first create clusters using each of the faces as a pivot. All faces with at least a threshold similarity, e.g., 90%, to the pivot face would be added to that cluster. Such a process can result in the same face being present in multiple clusters. Duplicate faces can be removed from a smaller cluster while clusters that include a number of faces exceeding a minimum threshold, e.g., 10, can be referred to as "good" clusters. Further discussion of clustering techniques are described in greater detail in U.S. patent application Ser. No. 12/172,939, entitled "Method And System For Automated Annotation Of Persons In Video Content," which is incorporated by reference herein in it entirety.

An image from the largest cluster or any of the good clusters can then be identified as a representative image. In the case where there are no good clusters, a representative image can be chosen from the largest cluster.

In an embodiment, a representative image is configured to include only a headshot image, e.g., not a full body image or group image. The selection of a headshot representative image is based on a scoring algorithm. For example, when a cropping of an image is not allowed, or not possible, each image is given a noimalized headshot score based on the portion of the image that depicts the face of the person of interest. Therefore, a group photo will have a smaller score than that of a portrait photo. Further, if a particular image aspect ratio is desired, then the chosen image is extended along one of the dimensions to fit the desired aspect ratio. The extended image dimensions are used in the headshot score computation. A representative headshot image is chosen based on the highest scoring image where the optimal choice is an image taken from among the good clusters. However, if no good clusters are available, then the highest scoring image from all images is selected. If there are several images with the same highest score, then the image from the largest cluster is selected.

Recognition

This section describes, according to an embodiment of the present invention, the process of recognition using the constructed biometric models. In an embodiment, a classification approach is chosen that is able to pass through an entire training dataset in close to real time. As latency is an issue for large scale datasets, recognition can be performed with a variant of the nearest neighbor classifier.

In an embodiment, given a query image $I_{query}$, the feature vector $\vec{f}_{query}$ is compared to all images in the training data. With the same similarity metric as in training, the first k most similar images for all Q categories are chosen. The final selection of face label for the query is based on the following assumptions. First, since the training data is not guaranteed to be accurate there may be incorrectly labeled images that would have a very high similarity with the query image, thus finding a single most similar image in training and transferring its label is not optimal. Second, if the model $M^q$ is chosen to identify with the highest average similarity to $\vec{f}_{query}$, then due to variable model sizes and uncertainty of training labels, the average similarity across all models is almost uniform. Thus, in an embodiment, a distance function is chosen that is in-between the two extremes:

$$sim(I_{query}, q) = \frac{1}{K}\sum_{k=1}^{K} \phi(\vec{f}_{query}, \vec{f}_{M_k^q})$$

where $M_k^q$ are the K most similar training images in $M^q$ to the query image $I_{query}$ and $sim(I_{query}, q)$ is the k-average similarity of query image I to person q. Finally, the label for the query image is:

$$label(I_{query}) = \arg\max_{q}(sim(I_{query}, q)).$$

Recognition of faces in the wild is inherently an open-set problem where the celebrity depicted in a query image might not be amongst those known by the recognition system. To address this, in an embodiment, a recognition likelihood threshold, $\tau_r$, is introduced. If the similarity with the best matching celebrity model does not exceed this threshold, $sim(I_{query}, q) < \tau_r$, the system declines to recognize the query face and instead reports the query face as "unknown."

Experimental Results

In an experiment corresponding to an exemplary embodiment, in order to evaluate the performance of the recognizer, a set of manually annotated query images was selected and the recognizer was used to propose either a celebrity name or "unknown" for each image. The performance was measured using two numbers: precision (the fraction of proposed names that were correct) and recall (the fraction of correct names proposed from amongst all images belonging to a celebrity known by the recognizer). Precision and recall vary depending on the choice of a recognition likelihood threshold, e.g., a higher threshold produces higher precision, but lower recall. Thus the precision and recall was evaluated for a range of thresholds. The result is summarized with precision versus recall plots in FIGS. 2 and 3.

The goal of the experiment was to recognize faces of people using ordinary images, including those with low resolution and poor imaging conditions. Therefore, experimentation was done on three different and natural datasets. As described herein, the performance of the exemplary embodiment will be compared to state-of-the-art approaches using a test set of images using a mobile device with a 1 mega-pixel camera, to replicate real life user experiences and report recognition results of various stages of the exemplary embodiment, as well as other approaches. The performance of the exemplary embodiment will also be compared to that of the most related work and test data of Names and Faces, *In Submission*, by Berg, Berg, Edwards, Maire, Teh, Learned-Miller, and Forsyth ("Berg et al.").

Recognition of 30,000 Famous People

In accordance with an embodiment of the present invention, in order to determine the scalability and realistic performance of the algorithms presented above, a list of approximately 30,000 names was constructed. For a test, over 1000 names were picked from the list and face images were acquired for each corresponding name. Purposefully, the images were acquired in variable lighting and poses, ranging from face shots on magazine covers to television screens. All images were taken with a mobile phone having a 1 mega-pixel camera. In the test, the performance of the approach was compared at various stages of the pipeline and was also compared to the raw output from the image system, which in this test was Google Image Search (GIS). In particular, models were compared that were built using 20 and 50 results from GIS with face filter turned on (GIS, top 20/50 faces); models built only using the first stage of the pipeline, nearest neighbor grouping (Intra-model); models built using first two stages of the pipeline that includes duplicate removal (Inter-model); and finally models built using the entire pipeline (Spectral). In addition, the performance was compared using an algorithm, on the same dataset, developed by Zhao et al. (In *Automatic Faced and Gesture Recognition*, 2008. FGR 2008. 8th Int. Conf. on, 2008), incorporated herein by reference in its entirety. The precision/recall curves are shown in FIG. 2 with line 201 indicating GIS, top 20 faces; line 203 indicating GIS, top 50 faces; line 205 indicating consistency; line 207 indicating consistency with neardupes; line 209 indicating inter-model; line 211 indicating spectral; and line 213 indicating intra-model.

Figure 2:
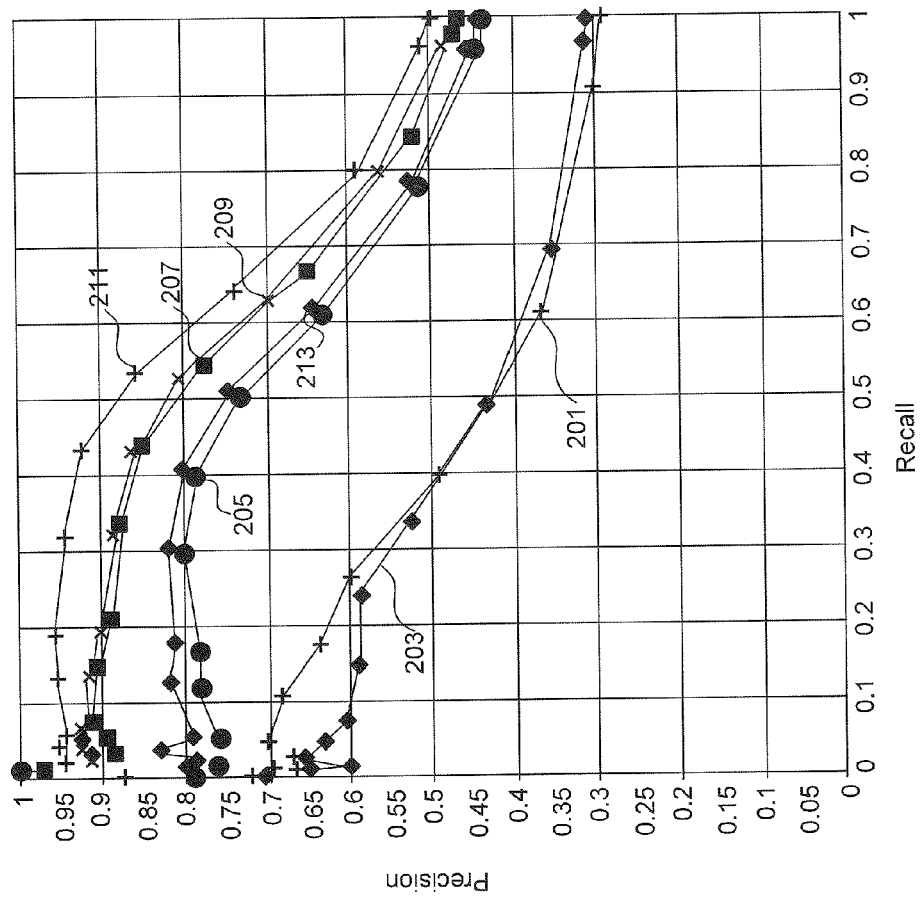
FIG. 2 shows a graphic representation of recognition performance at intermediate stages according to an embodiment of the present invention.

FIG. 2, in an embodiment, shows that each proposed stage of the pipeline delivers a clear contribution and improves the overall performance of the system. A trend of low precision at high recall (>0.5) is visible for all algorithms. The high recall region of these curves corresponds to recognition of people with very few images in GIS. Thus, to be able to recognize such people, e.g., to reduce the false negatives to increase the recall, the number of false positives allowed must increase, leading to lower precision.

In comparison with the raw output of GIS, it is evident that varying the size (20 or 50) of the GIS output does not result in substantial input. In fact, increasing GIS output only decreases the signal-to-noise ratio and leads to less accurate biometric models and worse recognition. Using the presented pipeline, however, as many images as possible were extracted from GIS with the upper limit of 1000, using the various stages of the pipeline to eliminate falsely labeled images.

Aside from comparing the contributions of each stage of the pipeline to the recognition accuracy, the time required to train each stage and the resultant model size, delivered by each stage, were considered. The runtime and size are given below in Table 1. The consistency learning of Zhao et al. has the same order of complexity $O(n^2)$ as the Inter-model stage of the pipeline, where n is the number of faces. However, due to its sampling strategy that may be $O(1000*n^2)$, where 1000 is the number of random samples, while Inter-model analysis is $O(1*n^2)$. More importantly, the Inter-model analysis is deterministic unlike the consistency learning scheme. In practice, consistency learning, the only other approach for large scale face recognition, is over 3 fold slower than the approach in this exemplary embodiment (combining Intra-model, Inter-model and Spectra), and results in over 11% worse recognition rate (improvement in F-measure).

TABLE 1

Performance statistics of various algorithms and pipeline stages

| Algorithms | Runtime (CPU hours) | Size (# of Faces) | F-measure |
| --- | --- | --- | --- |
| GIS top 20 | — | 415683 | 0.46 |
| GIS top 50 | — | 863299 | 0.47 |
| Intra-model | 12 | 772317 | 0.63 |
| Zhao et al. | 6500 | 2049406 | 0.62 |
| Zhao w/Inter-model | 3000 | 735720 | 0.66 |
| Inter-model | 2133 | 737476 | 0.67 |
| Spectral | 2 | 701948 | 0.69 |

Recognition of "Names and Faces"

Figure 3:
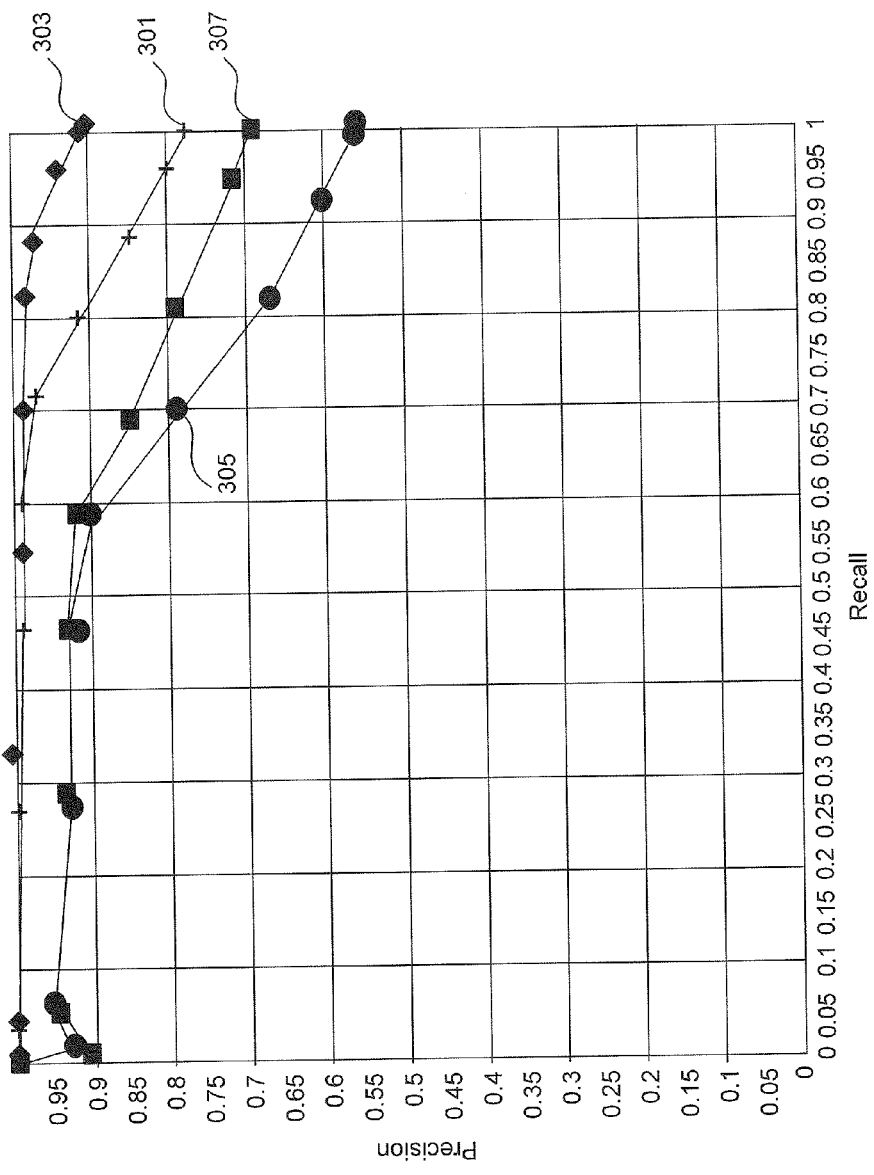
FIG. 3 shows a graphic representation of recognition performance for a specific dataset according to an embodiment of the present invention.

To compare the performance of the approach in the exemplary embodiment to other methods and test sets, the recognition experiment of Berg et al. was repeated. Berg et al. selected 1000 random images from their dataset with associated news captions. Using a language model coupled with a face recognizer, a name, from the caption, was chosen as the label for the given face. To mimic this experiment, it was required that all true names in test data are present in the name-list for training. Two different versions of training data were used: generic and specific. The generic training included a name-list of approximately 30,000 names to train the respective biometric models without any supervision, while the specific training only contained the names that were present in the test set, the standard in the computer vision community. For the test data, two versions were also created: test 1 and test 2. Some of the labels for test images, provided by Berg et al., were of the form 'christian palestinian' and 'young afghan.' These labels are not unique names of people and clearly do not produce a deterministic set of results if used as a query to GIS. Therefore, a few test images with such labels were removed from the test data for test 1. In test 2, images with labels that did not produce significant response in GIS were also removed. FIG. 3 illustrates the ROC curves and shows the performance of the two training and test sets described above with line 301 illustrating the Berg only training test 1; line 303 illustrating the Berg only training test 2; line 305 illustrating the generic training test 1; and line 307 illustrating the generic training test 2. A summary of the performance statistics is shown below in Table 2.

TABLE 2

Performance statistics of various algorithms and pipeline stages

| Algorithm | Rank 1 Recognition |
| --- | --- |
| Specific Training: test 1 | 77% |
| Specific Training: test 2 | 90% |
| Generic Training: test 1 | 55% |
| Generic Training: test 2 | 69% |
| Berg et al.: test 1 | 78% |

If, however, reversion is made to the traditional training schemes, and guarantees that the training set contains exactly the categories that are present in the test, (Specific Training: test 1), then the exemplary embodiment performs equally well with Berg et al., while solving a more general problem that is not constrained by the news captions and language models. Finally, if it is required that there must exist training data for all test categories, a fair requirement, then test 2 is defined. In this case the exemplary embodiment significantly outperformed Berg et al., and yielded a recognition system, whose precision dropped only 10% throughout the entire recall domain.

Failure Cases

Due to the statistical nature of the presented algorithms, and the reliance on an imperfect source of annotated images, e.g., GIS, there are a number of avenues by which mistakes can enter the instant trained celebrity models, thereby producing incorrect recognition results.

The first and most common of these is the problem of models for less-famous celebrities becoming polluted with faces of more-famous celebrities with whom they are closely associated. For example, while the model for Sarah Palin is clean, containing 78 images without mistakes, the model for her less-notable daughter Bristol Palin contains 7 images of her mother. As a result, some query images of Sarah Palin will be incorrectly recognized as Bristol, not because there is any problem with Sarah Palin's model, but rather because another model has mistakes. This problem can be attributed to the fact that, in this example, GIS results for less-notable people are inherently noisier. Interestingly, models of two strongly associated but extremely famous celebrities, such as Brad Pitt and Angelina Jolie, do not show this problem, likely due to the high signal-to-noise ratio in their individual GIS results.

A second issue is the use of canonical names when issuing GIS queries. For example "Prince Henry of Wales" returns relatively few, noisy results producing a model that contains only a single face, whereas the more colloquial "Prince Harry" would return a significantly more comprehensive collection. As a result of this impoverished model, inter-model analysis is unable to remove faces of the Prince from the model of his love interest, Chelsy Davy. This problem could be caused by collecting GIS results for each of a celebrity's aliases and selecting the best model, or aggregating the results.

Other categories which can be problematic include fashion designers, whose GIS results are dominated by photos of others wearing their creations, and celebrities wearing sunglasses, which can occasionally be confused by the face similarity function.

System Components

Figure 4:
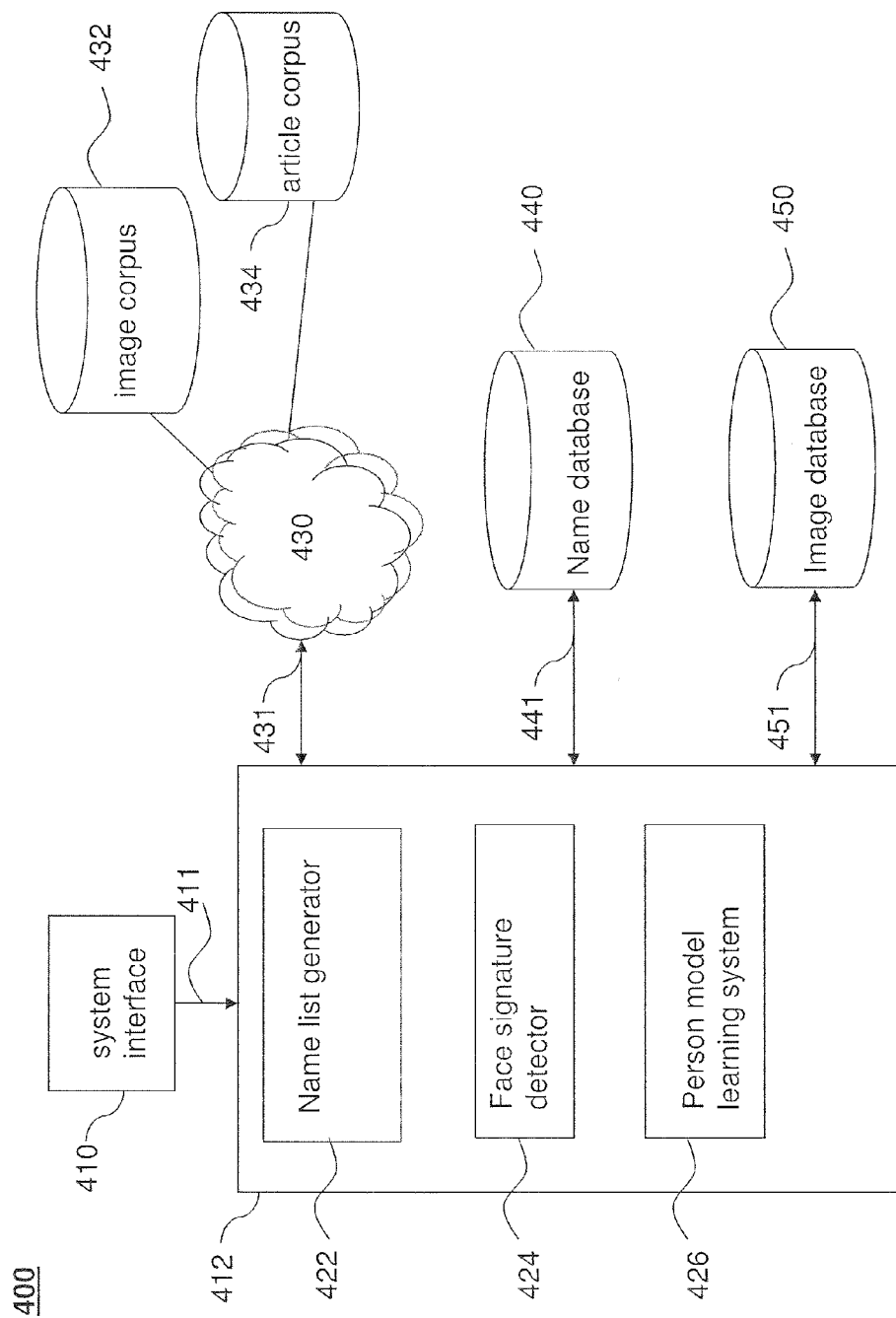
FIG. 4 is a system view according to one embodiment of the present invention.

FIG. 4 shows a system 400 that can automatically identify a celebrity name and identify, recognize, and associate a facial image with the identified celebrity name, according to an embodiment of the present invention. A face recognition detector 412 is coupled to a system interface 410 through a connection 411. System interface 410 may be, for example, a user interface or an application programming interface located on the same computing platform as face recognition detector 412, or a remote user interface, such as, for example, a web client. Accordingly, connection 411 may use a connection method, such as, for example, a communications bus, Ethernet, or a wireless communication standard, or other communication protocol.

System interface 410 can exist on a device that includes at least one processor, at least one memory, and at least one network interface. For example, system interface 410 can be implemented on a personal computer, handheld computer, personal digital assistant, a mobile communication device, a game console, digital entertainment system, set-top box, and the like.

Face recognition detector 412 can exist on a server and can include a web server such as the Google Web Server from Google Inc., Apache Web Server from the Apache foundation, Internet Information Services from Microsoft, and the like. Face recognition detector 412 can provide access to web content stored locally or on coupled storage devices (not shown). Face recognition detector 412 typically includes at least one server computer connected to a network. Example server computers include but are not limited to, a computer, workstation, distributed computing system, computer cluster, embedded system, stand-alone electronic device, networked device, mobile device (e.g. mobile phone or mobile computing device), rack server, set-top box, or other type of computer system having at least one processor, memory, and network interface.

Face recognition detector 412 can also access an image/video corpus 432 and an article corpus 434. Some or all of corpora 432 and 434 may be accessible through a network 430, such as, for example, a wide area network (WAN) like the Internet or a local area network (LAN), or may be located locally on a user's own system. Corpora 432 and 434 may each include one or more storage devices that are co-located or distributed. In some embodiments, corpora 432 and 434 may be co-located in part or in whole. Face recognition detector 412 may be coupled to network 430 through any connection 431 including, for example and without limitation, a communications bus, Ethernet, and a wireless communication standard. Image/video corpus 432 may include images in any image format, such as, JPEG, Exif, TIFF, RAW, PNG, GIF, BMP, PPM, CGM, SVG, PNS, JPS, and MPO. Image/video corpus 432 includes images of persons. Article corpus 434 includes, for example, article archives, web based services, and repositories accessible locally and/or over the Internet. Available article archives may include, for example and without limitation, ASCII text, PDF text, and other forms of text.

Face recognition detector 412 is also coupled to a name database 440 and an image database 450, over connections 441 and 451, respectively. Name database 440 includes name lists of celebrities identified and ranked by face recognition detector 412 based on, at least, names identified in articles available in article corpus 434. Such generation of name lists will be further described with respect to FIG. 5, below. Image database 450 includes face images, from any type of image content including still images and video images, for persons in a name list of celebrities represented in name database 440. Face images in image database 450 are generated and identified, at least, on images found in image/video corpus 432. As used in this disclosure, "database" refers to any collection of data elements, and associated storage and access mechanisms. Connections 142 may use one or more connection methods, such as, for example, a communications bus, Ethernet, and wireless communications standards.

Face recognition detector 412 can include several components, including a name list generator 422, a face signature detector 424, and a person model learning system 426. Face recognition detector 412 and some or all of the sub-systems 422, 424, and 426 may be implemented in software, hardware or any combination thereof. For example, face recognition detector 412 may be implemented as executable code on a central processor unit (not shown in FIG. 4). In another embodiment, face recognition detector 412 may be implemented in a hardware component such as a Field Programmable Gate Array. A person skilled in the art would understand that face recognition detector 412 may be implemented in one or more platforms.

Name list generator 422 generates a list of names of prominent celebrities that the system will attempt to recognize. The list of names, or name list, is generated based on articles from article corpus 434. Name list generator 422 filters the articles from article corpus 434 to only include those articles that describe people. Name list generator 422 ranks the names in the name list based on the number of face images returned by an image search that is described in more detail below.

Face signature detector 424 removes "non-face" images from the initial images generated by name list generation detector 422 and is described in more detail below.

Person model learning system 426 takes as input the face images produced by face signature detector 424 and generates highly accurate biometric models for the individuals identified in the name list. Person model learning system 426 uses a series of analysis sub-systems to further refine the name and image association that ultimately generates a name associated with a queried face or indicates that the queried face is "unknown."

Figure 5:
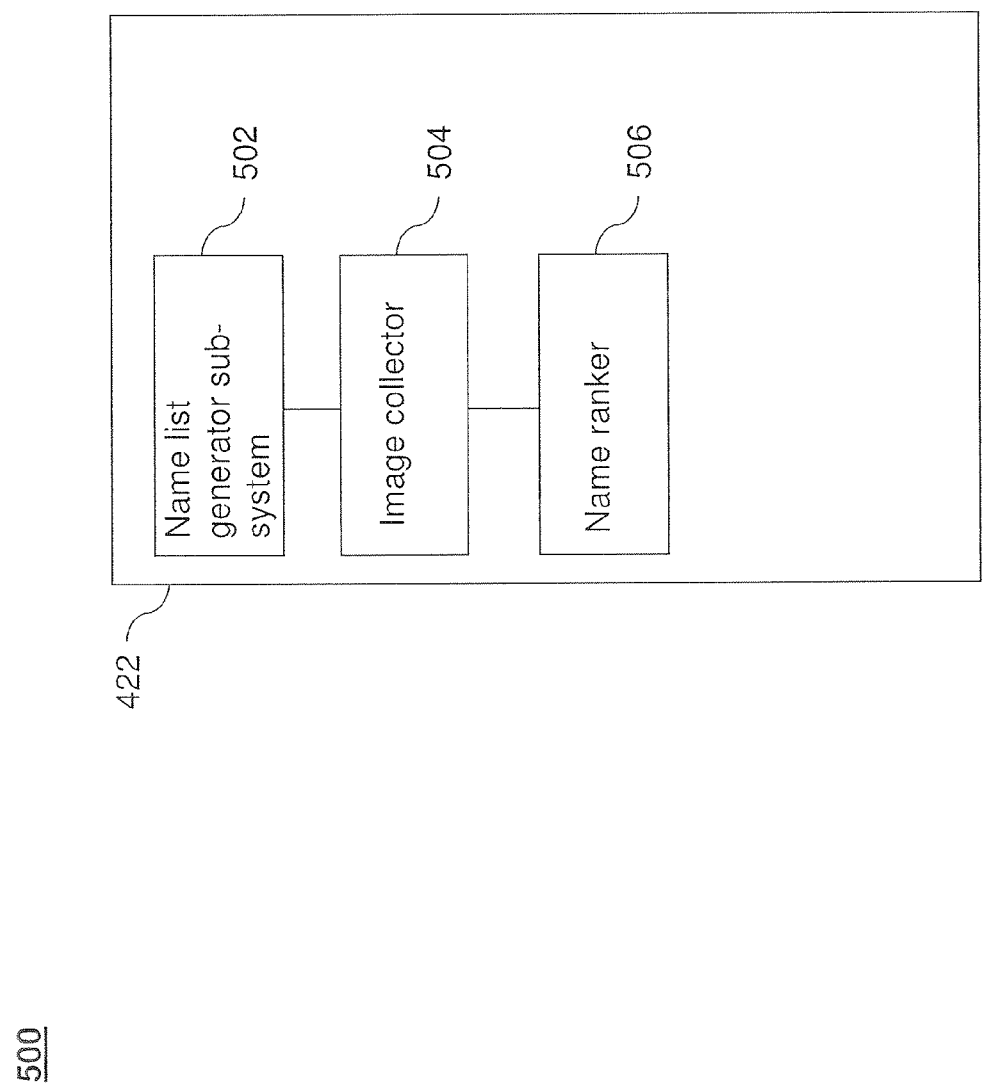
FIG. 5 shows components of a name list generator according to an embodiment of the present invention.

FIG. 5 shows components of name list generator 422 according to an embodiment of the present invention. Name list generator 422 includes name list generator sub-system 502, image collector 504, and name ranker 506.

Name list generator sub-system 502 generates a list of names based on articles found in article corpus 434. Name list generator sub-system 502 identifies articles in article corpus 434, selecting and filtering only those articles that contain names of people. Once a list of names is obtained, image collector 504 collects a set of images from any type of image content, e.g., still and/or video, and corresponding feature vectors for each name. This is accomplished, for example, by issuing an image search to image/video corpus 432. In an embodiment, image collector 504 contains a threshold value of the number of images returned for each query which it will not exceed. Image collector 504 detects faces in each image extracting feature vector and putatively labels each feature vector with the query from which it was obtained. Name ranker 506 then ranks the names in the name list based on the number of face images identified by image collector 504.

Figure 6:
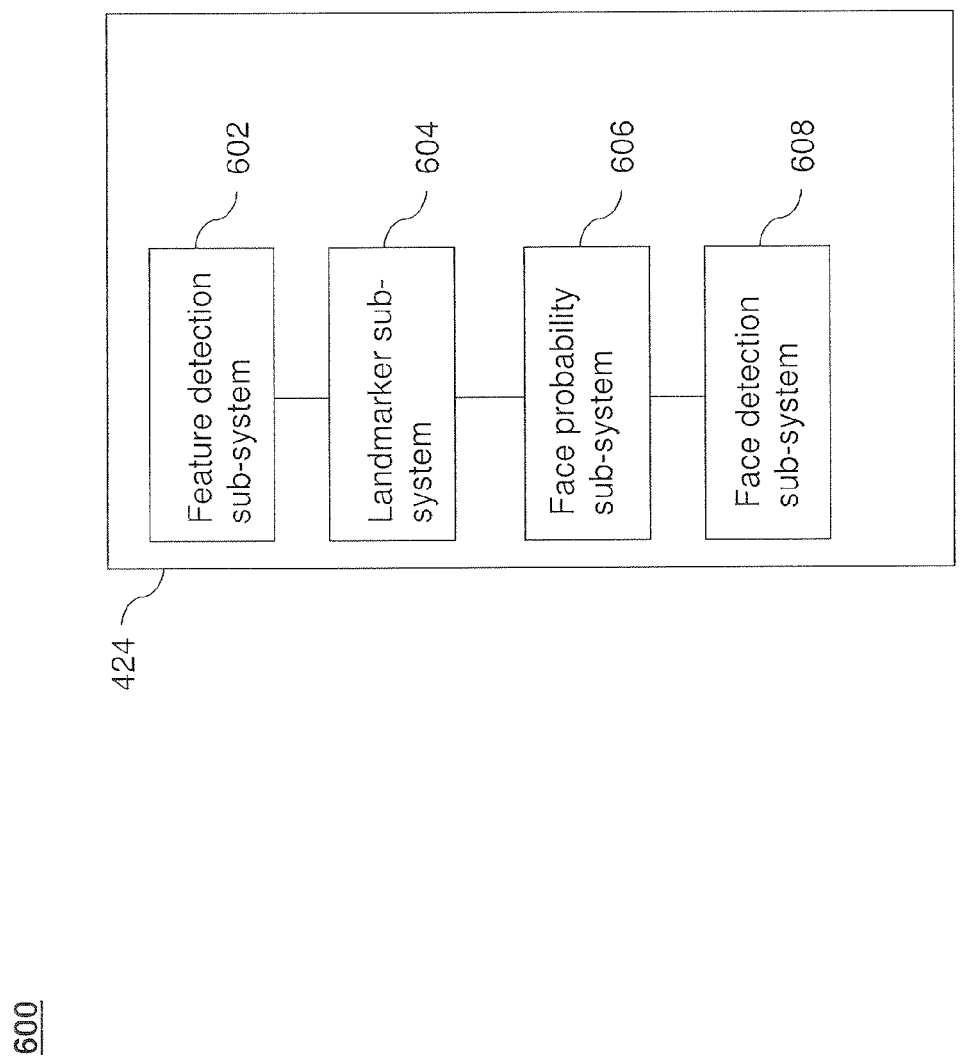
FIG. 6 shows components of a face signature detector according to an embodiment of the present invention.

FIG. 6 shows components of face signature detector 424 according to an embodiment of the present invention. Face signature detector 424 includes feature detection sub-system 602, landmarker sub-system 604, face probability sub-system 606, and face detection sub-system 608.

Feature detection sub-system 602 uses, for example, a fast sliding window approach over a range of window sizes employing a linear combination of a heterogeneous set of feature detectors, as previously discussed. In an embodiment, landmarker sub-system 604 can be used to further refine face detection by pinpointing facial feature locations within a face bounding box. Face probability sub-system 606 then extracts features at the locations identified by landmarker sub-system 604 in order to obtain a refined score that indicates the probability of a face being present. Face detection sub-system 608 then determines, based on, at least, the detected features and probabilities of a face being present, that a face has indeed been detected.

Figure 7:
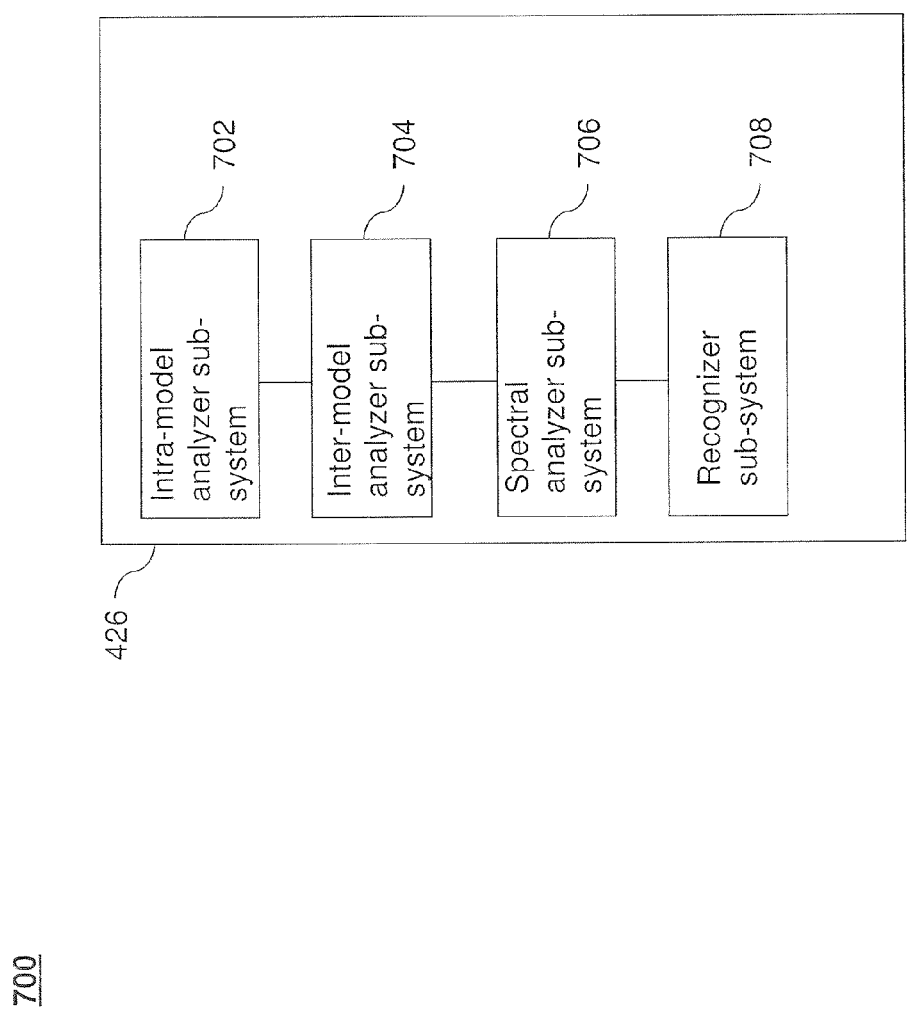
FIG. 7 shows components of a person model learning system according to an embodiment of the present invention.

FIG. 7 shows components of person model learning system 426 according to an embodiment of the present invention. Person model learning system 426 includes intra-model analyzer sub-system 702, inter-model analyzer sub-system 704, spectral analyzer sub-system 706, and recognizer sub-system 708.

Intra-model analyzer sub-system 702 effects the first phase of removing incorrectly labeled face signatures from face signature detector 424. Intra-model analyzer sub-system 702 examines all the face images associated with a single name in the name list, deciding which faces to discard without considering the faces belonging to other names. The task of intra-model analyzer sub-system 702 is to remove obvious outliers where faces that are very dissimilar from the majority of other faces associated with a particular name are removed.

Given a group of face signatures all labeled with the same celebrity name, intra-model analyzer sub-system 702, for each face, counts the number of neighbors and the number of near-duplicates in the group. In an embodiment, a neighbor is defined as a face with distance less than a value, e.g., 0.2, and a near-duplicate has a distance less than a second value, e.g., 0.01, where distances range from a minimum of 0.0 to a maximum of 1.0. Intra-model analyzer then discards all faces with less than a third value, e.g., 10, neighbors. Finally intra-model analyzer sub-system 702 removes near-duplicate faces from the group by sorting the faces in decreasing order based on the number of near duplicates it has in the group. For each face in the sorted list, the decision is made to discard it if it has a near-duplicate appearing earlier in the list; otherwise it is retained.

Inter-model analyzer sub-system 704 receives the collection of labeled faces from intra-model analyzer sub-system 702, and attempts to further remove incorrectly labeled entries by comparing faces annotated with different names. Inter-model analyzer sub-system 704 identifies and removes faces associated with a name in the name list that have been incorrectly labeled with another name from the name list.

If the name list contains two near-duplicate faces with different labels, then almost certainly one, or both, of the labels is incorrect, and the face cannot be used to reliably label incoming query faces. Inter-model analyzer sub-system 704 at this stage aims to resolve near-duplicate faces, by considering all faces in the collection in a pairwise manner. For each pair, if the faces have a distance less than a value, e.g., 0.01, and the labeled celebrity names disagree, then the face with the smallest near duplicate count, as calculated by Intra-model analyzer sub-system 702, is marked for later removal. Once all face signature pairs have been considered, the faces marked for removal are discarded from the collection. However, this formulation compares each face against every other face in the collection. Thus is it possible for a single face signature to "lose" during some comparisons, or be marked for removal, and "win" other comparisons. Face signatures are discarded by inter-model analyzer 704 from the collection if they "lose" during any comparison.

Spectral analyzer sub-system 706 effects the final stage of analysis and uses two components. The first component is based on intra-person comparisons, and the second component is based on inter-person comparisons. Spectral analyzer 706, using an intra-person comparison, considers the collection of images for each person individually. Spectral analyzer 706 constructs a distance matrix to describe the pairwise relationships between all of the images of one person. The distance matrix is transformed into a graph Laplacian matrix and its spectrum is analyzed. If the second eigenvalue of the graph Laplacian is less than the Eigen gap, e.g., set to 0.4, then no clustering of the collection is performed. Otherwise, if the second eigenvalue is larger than the Eigen gap, then the collection is partitioned into two clusters using Average Agglomerative Clustering. One of the two clusters is discarded as outliers. The cluster selection is done either by the statistics of the clusters (e.g., cluster size, or average in class image rank, or average duplicate count computed in the previous stages) or by comparing to the image collections of other people. An embodiment using a "light" version of such a comparison is performed with the collection of images of the person who has a higher identifier overlap with the current person. Note, before the comparison of clusters is performed a dominance may be established between the current collection and the one with the highest identifier overlap. Dominance may be computed by analyzing the spectrum of the graph Laplacian of each collection. The collection having the higher second eigenvalue is considered dominant. In another embodiment, using a "full" version, the comparison is done with the collections of all persons in the name list.

Spectral analyzer 706, using an inter-person comparison, can use a "light" embodiment and also a "full" version embodiment. The inter-person "light" embodiment examines the similarity of each image in the collection to the remainder of the collection and to all of images in the collection of the person with whom most identifiers are shared. If the images' similarity to one collection is less than that of another collection, then the given image is considered an outlier. In the "full" version embodiment, the same comparison is performed, except that all other collections are considered recursively, not just the one with highest identifier overlap.

Recognition sub-system 708 performs the final decision regarding whether a queried face is recognized or unknown. In an embodiment, as previously described, recognition sub-system 708 uses a recognition likelihood threshold value. If the similarity with the best matching face image does not exceed the threshold value, recognition sub-system 708 declines to recognize the queried face and report the queried face as unknown. Otherwise, recognition sub-system 708 presents those recognized faces with the associated corresponding names.

Figure 8:
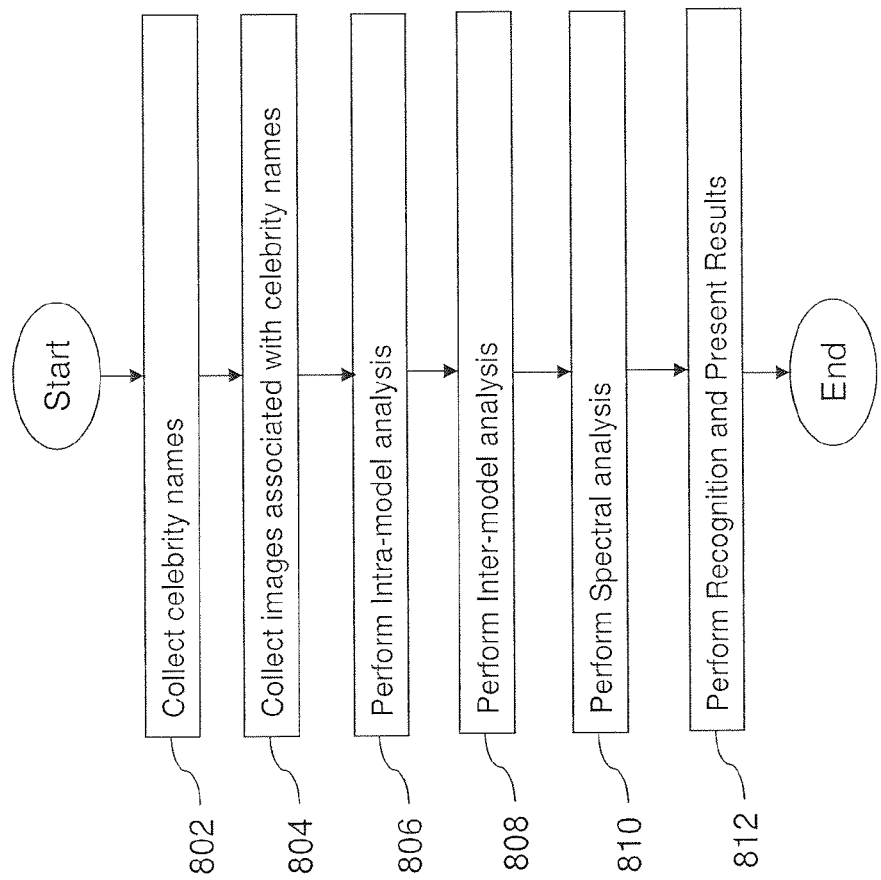
FIG. 8 shows a method for automatically mining person models of celebrities according to an embodiment of the present invention.

FIG. 8 is a flowchart depicting a method 800 for automatically mining person models of celebrities, according to an embodiment of the present invention. In step 802, names of celebrities are identified and collected. In step 804, images associated with the names of celebrities collected in step 802 are identified, collected, and ranked. In step 806, an intra-model analysis is performed to remove incorrectly labeled images based on the images associated with a particular celebrity. In step 808, an inter-model analysis is performed to further remove incorrectly labeled images by comparing faces annotated with different celebrity names. In step 810, a spectral analysis is performed to further refine incorrectly labeled images using a distance matrix. In step 812, a determination is made whether a particular image is associated with a particular celebrity name.

Example Computer System Implementation

Aspects of the present invention shown in FIGS. 1-8, or any part(s) or function(s) thereof, may be implemented using hardware, software modules, firmware, tangible computer readable media having instructions stored thereon, or a combination thereof and may be implemented in one or more computer systems or other processing systems.

Figure 9:
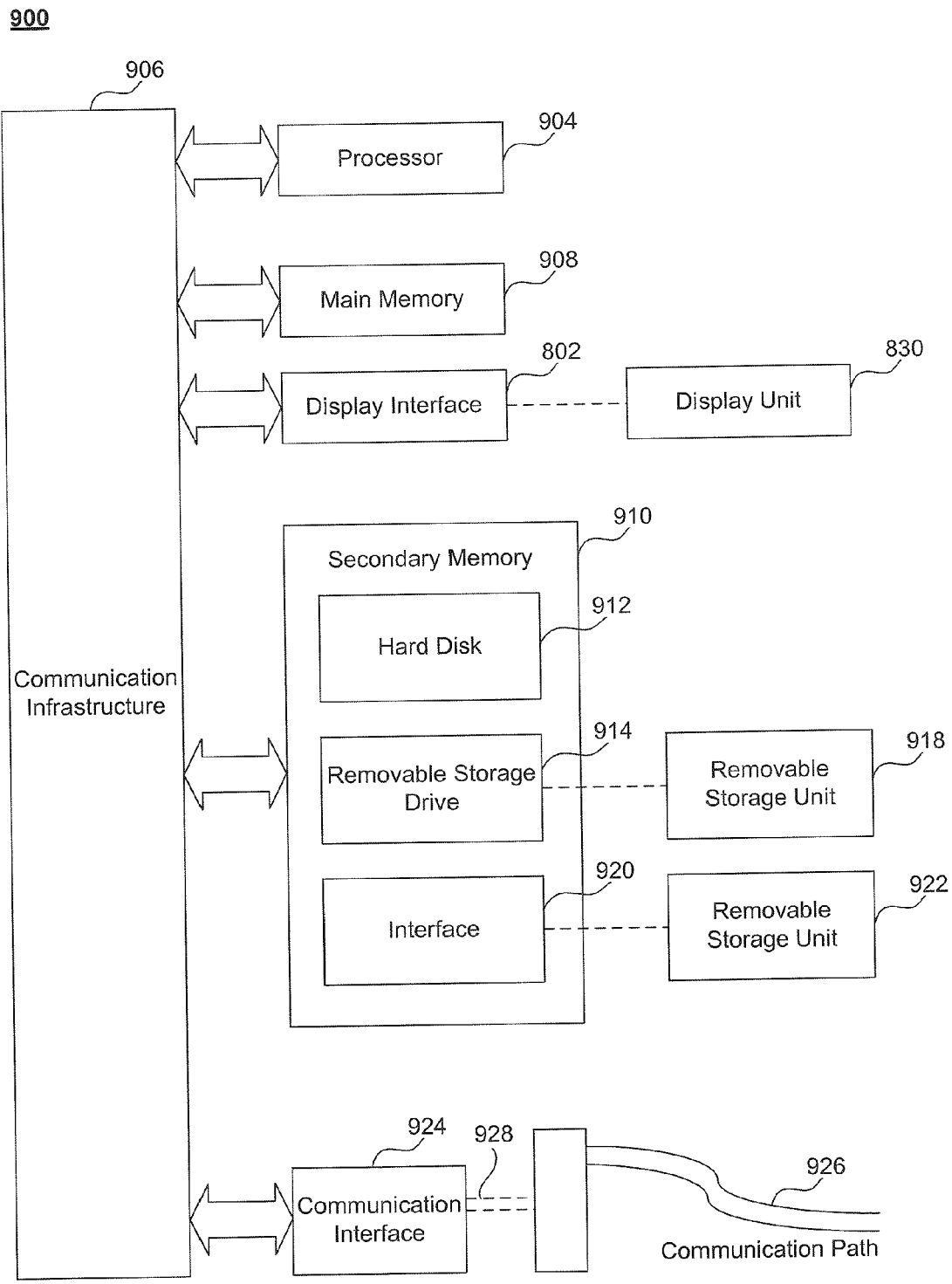
FIG. 9 illustrates a computer system to perform automatic mining of person models of celebrities, according to an embodiment of the present invention.

FIG. 9 illustrates an example computer system 900 in which embodiments of the present invention, or portions thereof, may by implemented as computer-readable code. For example, system 400, may be implemented in computer system 900 using hardware, software, firmware, tangible computer readable media having instructions stored thereon, or a combination thereof and may be implemented in one or more computer systems or other processing systems. Hardware, software, or any combination of such may embody any of the components in FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server faun. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input/output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the stages in the method illustrated by flowchart 800 of FIG. 8 discussed above. Accordingly, such computer programs represent controllers of the computer system 900. Where the invention is implemented using software, the software may be stored in a computer program product and loaded into computer system 900 using removable storage drive 914, interface 920, and hard disk drive 912, or communications interface 924.

Embodiments of the invention also may be directed to computer program products comprising software stored on any computer useable medium. Such software, when executed in ode or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method of automatic face recognition, comprising:
    obtaining a name list from one or more articles, wherein the name list includes a name for each person in a group of persons;
    obtaining a collection of images for each person in the group using the name of that person;
    selecting, from the collection of images for each person in the group, a set of representative images for that person, each of the representative images being deemed as having a highest score amongst the collection with regard to a depiction of a headshot of that person;
    wherein selecting the set of representative images includes:
    determining a first set of one or more images from the collection which are deemed duplicative based on comparing images of the collection with other images of the collection;
    determining a second set of one or more images from the collection which match to an image in a collection of images for another person in the group; and
    determining, from a remainder of the collection which excludes the first set and the second set, one or more images which are considered to be outliers as compared to a remainder of images in the collection, in order to select the set of representative images.

2. The computer-implemented method of claim 1, further comprising filtering the one or more articles to retain only articles that contain names of people.

3. The computer-implemented method of claim 1, wherein selecting the set of representative images includes performing iterative binary clustering.

4. The computer-implemented method of claim 1, wherein determining the first set of one or more images from the collection includes performing intra-model analysis, and wherein determining the second set of one or more images from the collection includes performing inter-model analysis, and wherein performing the inter-model analysis is performed after the intra-model analysis.

5. The computer-implemented method of claim 1, further comprising ranking a set of names from the name list based on a quantity in the set of representative images of each person associated with one of the names in the set of names.

6. The computer-implemented method of claim 1, further comprising detecting a feature vector for one or more images in the set of representative images of the one or more persons in the group.

7. The computer-implemented method of claim 6, wherein detecting the feature includes identifying a facial feature location within the one or more images in the set of representative images of the one or more persons in the group.

8. A system, comprising:
    (a) a face image database;
    (b) a name database; and
    (c) a computer-based face recognition system, comprising:
        (i) a name list generator to obtain a name list from one or more articles, wherein the name list includes a name for each person in a group of persons;
        (ii) a face signature detector to obtain a collection of images for each person in the group;
        (iii) one or more analyzers to select, from the collection of images for each person in the group, a set of representative images for that person, each of the representative images being deemed as having a highest score amongst the collection with regard to a depiction of a headshot of that person;
    wherein the one or more analyzers select the set of representative images by:
    determining a first set of one or more images from the collection which are deemed duplicative based on comparing images of the collection with other images of the collection,
    determining a second set of one or more images from the collection which match to an image in a collection of images for another person in the group, and
    determining, from a remainder of the collection which excludes the first set and the second set, one or more images which are considered to be outliers as compared to a remainder of images in the collection, in order to select the set of representative images.

9. The system of claim 8, further comprising a recognizer configured to determine whether an input image depicts a person associated with a particular name in the name list based on the set of representative images for that person.

10. The system of claim 8, wherein the name list generator further comprises a name ranker configured to rank the one or more names in the name list based on a quantity in the set of representative images of each person in the name list.

11. The system of claim 8, wherein the face signature detector obtains the collection of images for each person in the group using a feature detector to detect face images based on Gabor wavelets.

12. The system of claim 8, wherein the face signature detector obtains the collection of images for each person in the group using a feature detector to detect face images based on a facial feature location within the one or more face images.

13. The system of claim 9, wherein the recognizer determines that there is no matching name associated with a given image.

14. The computer-implemented method of claim 1, further comprising performing recognition of an input image using the set of representative images for one or more of the persons in the group.

15. A non-transitory computer-readable medium that stores instructions, including instructions that when executed by one or more processors, cause the one or more processors to perform operations that comprise:
   obtaining a name list from one or more articles, wherein the name list includes a name for each person in a group of persons;
   obtaining a collection of images for each person in the group using the name of that person;
   selecting, from the collection of images for each person in the group, a set of representative images for that person, each of thSe representative images being deemed as having a highest score amongst the collection with regard to a depiction of a headshot of that person;
   wherein selecting the set of representative images includes:
   determining a first set of one or more images from the collection which are deemed duplicative based on comparing images of the collection with other images of the collection;
   determining a second set of one or more images from the collection which match to an image in a collection of images for another person in the group; and
   determining, from a remainder of the collection which excludes the first set and the second set, one or more images which are considered to be outliers as compared to a remainder of images in the collection, in order to select the set of representative images.

16. The non-transitory computer-readable medium of claim 15, further comprising instructions for filtering the one or more articles to retain only articles that contain names of people.

17. The non-transitory computer-readable medium of claim 15, wherein instructions for determining the set of representative images includes instructions for performing iterative binary clustering.

18. The non-transitory computer-readable medium of claim 15, wherein instructions for determining the first set of one or more images from the collection includes instructions for performing intra-model analysis, and wherein instructions for determining the second set of one or more images from the collection includes instructions for performing inter-model analysis, and wherein performing the inter-model analysis is performed after the intra-model analysis.

19. The non-transitory computer-readable medium of claim 15, further comprising instructions for ranking a set of names from the name list based on a quantity of associated representative images of each person associated with one of the names in the set of names.

20. The non-transitory computer-readable medium of claim 15, further comprising instructions for performing recognition of an input image using the set of representative images for one or more of the persons in the group.

* * * * *